United States Patent [19]

Morini et al.

[11] Patent Number: 5,508,245
[45] Date of Patent: Apr. 16, 1996

[54] SPHERICAL COMPONENTS AND CATALYSTS FOR THE POLYMERIZATION OF OLEFINS

[75] Inventors: Giampiero Morini, Voghera; Enrico Albizzati, Arona; Umberto Giannini, Milan; Matteo Nicolini, Cressa, all of Italy

[73] Assignees: Montell Technology Company bv, Netherlands; Montell North America Inc., Del.

[21] Appl. No.: 979,243

[22] Filed: Nov. 20, 1992

[30] Foreign Application Priority Data

Nov. 22, 1991 [IT] Italy ................... MI91A3131

[51] Int. Cl.$^6$ ............... B01D 31/00; C08F 4/02
[52] U.S. Cl. ............... 502/115; 502/104; 502/121; 502/122; 502/123; 502/124; 502/126; 502/132; 502/134; 526/122; 526/124.2; 526/125.8
[58] Field of Search ................... 502/104, 115, 502/121, 122, 123, 124, 126, 132, 134

[56] References Cited

U.S. PATENT DOCUMENTS

| | | | |
|---|---|---|---|
| 3,953,414 | 4/1976 | Galli et al. ................... | 502/127 |
| 4,399,054 | 8/1983 | Ferraris et al. ................... | 502/125 |
| 4,495,338 | 1/1985 | Mayr et al. . | |
| 4,579,833 | 4/1986 | Collumb et al. ................... | 502/121 |
| 5,221,651 | 6/1993 | Sacchetti et al. ................... | 502/126 |

FOREIGN PATENT DOCUMENTS 395083  10/1990  European Pat. Off. .

OTHER PUBLICATIONS

Hartill et al., "Novel Polymerization Catalysts For Ethene Based Upon Magnesium Chloride Supported Vanadium Chlorides," *Eur. Polym. J.* vol. 26, No. 5, pp. 529–533 (1990).

Al-Hillo et al., "Organomagnesium–reduced Vanadium (IV) Based Catalysts For Olefin Polymerization," *Polymer*, 1989, vol. 30 (Jul.), pp. 1336–1341.

European Search Report of EP 92 11 8955.

*Primary Examiner*—E. Rollins Cross
*Assistant Examiner*—E. D. Irzinsk
*Attorney, Agent, or Firm*—Bryan Cave

[57] ABSTRACT

Spherical components of catalysts for the polymerization of olefins comprising:

(a) a vanadium compound selected from the compounds of formula $VOX_2Y$ or $VX_nY_{n-4n}$, where X is Cl or Br and Y is Cl, Br OR or $NR^I_2$ (b) $MgCl_2$ in spherical form.

Said components have an average diameter greater than 1 μm, a surface area of at least 10 m$^2$/g, a porosity of at least 0.1 g/cm$^3$ and an X-ray spectrum having particular characteristics.

12 Claims, No Drawings

SPHERICAL COMPONENTS AND CATALYSTS FOR THE POLYMERIZATION OF OLEFINS

The present invention relates to catalyst components based on vanadium compounds, catalysts obtained therefrom and the use thereof in the polymerization of olefins $CH_2=CHR$, where R is hydrogen or an alkyl radical containing from 1 to 8 carbon atoms.

It is known that the use of vanadium-based catalysts in processes for preparing polyolefins has some advantages, such as for example the advantage of obtaining a quite broad molecular weight distribution in the case of polyethylene and a good comonomer distribution in the products deriving from copolymerization processes.

When used in a non-supported form, these catalysts exhibit non-regular morphological characteristics which are reproduced in analogous characteristics in the polymerization products.

Catalysts and related polymerization products having a precise morphology can be obtained by supporting the vanadium compounds onto porous inert supports, organic or inorganic, which are per se endowed with a defined morphology. Typically the support consists of silica. The supporting process has however the disadvantage of generally leading to poorly active catalysts.

The need is therefore felt for the availability of vanadium catalysts having a spherical morphology, so that they are suited to the modern polymerization processes both in the liquid phase (in solvent or in monomer) and in the gas phase, and exhibit at the same time sufficient activity in the polymerization stage.

It has now been found that it is possible to obtain vanadium catalysts having a spherical morphology by supporting a vanadium compound onto spherical $MgCl_2$, said catalysts exhibiting high activity in the (co)polymerization of olefins. The morphological characteristics of the catalyst component of the invention and the catalysts obtained therefrom are such that a more efficient control of the polymerization process can be achieved and polymerization products can be prepared which do not require a pelletization step.

The high activity of the catalysts of the invention is completely unexpected considering that catalysts obtained by supporting vanadium compounds onto magnesium chlorides in active form do not exhibit high activity (see U.S. Pat. No. 4,495,338, Example 13).

The catalyst components of the invention comprise a vanadium compound having formula $VOX_2Y$ or $VX_nY_{4-n}$, wherein:

X is Cl or Br;

Y is Cl, Br, OR or $NR'_2$, wherein:
   R is a $C_1$–$C_{18}$ aliphatic or cycloaliphatic or aromatic hydrocarbon radical;
   $R'$ is a $C_1$–$C_{10}$ aliphatic or cycloaliphatic hydrocarbon radical; and
   $2 \leq n \leq 4$;

the vanadium compound being supported onto an $MgCl_2$ support in spherical form and the components having an average diameter greater than 1 μm, a surface area of at least 10 m$^2$/g, a porosity of at least 0.1 cm$^3$/g and an X-ray spectrum wherein:

a) reflections (characteristic of magnesium chloride) are present at angles 2θ of 35° and 14.95°; or b) the reflection at 2θ=35° is replaced by a halo showing a maximum of intensity comprised between angles 2θ of 33° and 35°.

In the case where the catalyst components show an X-ray spectrum of the type indicated in b), frequently the halo shows maximum intensity between angles 2θ of 33.5° and 35°, and the reflection at 2θ=14.95° is not present.

For the definition of the X-ray spectrum of magnesium chloride, reference has been made to the standard ASTMD-3854. The spectrum is obtained using a Cu anti-cathode and K α radiation.

Preferably the catalyst components have a surface area greater than 50 m$^2$/g, and in particular comprised between 50 and 400 m$^2$/g, a porosity comprised between 0.1 and 0.5 cm$^3$/g and an average diameter between 10 and 50 μm.

By spherical catalyst components, the products intended are those obtained using $MgCl_2$ in the form of spheriform particles wherein the ratio between major axis and minor axis is smaller than 1.5 and preferably smaller than or equal to 1.3.

Said catalyst components form, with aluminum alkyls, catalysts for the (co)polymerization of olefins, in particular of ethylene and mixtures thereof with α-olefins such as propylene, 1-butene, 1-pentene, 4-methyl-1-pentene, 1-hexene, 1-octene. Preferred Al-alkyl compounds are the trialkyl derivatives, in particular triethyl aluminum ($AlEt_3$), triisobutyl aluminum ($AliBu_3$), tributyl aluminum ($AlBu_3$), tri-n-hexyl aluminum ($AlnEs_3$). Other useful Al-alkyl compounds are the Al-dialkyl monohydrides, the Al-dialkyl monoalkoxides and the Al-dialkyl monochlorides.

The Al/V molar ratio used in the preparation of the catalysts is greater than 1 and generally comprised between 10 and 500.

The spheriform support can be prepared from hydrated magnesium dichloride, in particular $MgCl_2 \cdot 6 H_2O$, obtained in spherical form according to the method described in U.S. Pat. No. 3,953,414, herein incorporated by reference.

According to an alternate method, the support can be prepared in spherical form starting from adducts of $MgCl_2$ with electron-donor compounds, in accordance with the description in U.S. Pat. Nos. 4,469,648 and 4,399,054, both of which are herein incorporated by reference.

Particularly preferred is the preparation of a support obtained starting from an adduct of $MgCl_2$ with an electron-donor compound preferably containing active hydrogen atoms, such as for example alcohols, phenols or water. A preferred preparation method is described in Patent Application No. EP-A-395083, herein incorporated by reference.

Preferred vanadium compounds are those where X=Cl, and in particular $VOCl_3$, $VCl_4$, VO(O-Me)$Cl_2$, VO(O-Et)$Cl_2$, VO(O-nBu)$Cl_2$, VO(O-iBu)$Cl_2$, VO(O-$C_6H_5$)$Cl_2$, $VCl_3$(O-Me), $VCl_3$(O-Et), $VCl_3$(O-nBu), $VCl_3$(O-iBu), $VCl_3$(O-$C_6H_5$), $VCl_{2(O-Me)2}$, $VCl_2$(O-Et)$_2$, $VCl_2$(O-nBu)$_2$, $VCl_2$(O-iBu)$_2$, VO(N-Me$_2$)$Cl_2$, VO(N-Et$_2$)$Cl_2$, VO(N-nBu$_2$)$Cl_2$, $VCl_3$(N-Me$_2$), $VCl_3$(N-Et$_2$), $VCl_3$(N-nBu$_2$).

The preparation of the catalyst component starting from the spheriform adducts of $MgCl_2$ with electron-donor compounds can be carried out in a single step, by reacting one or more times the $MgCl_2$ adduct with the vanadium compound, neat or diluted in suitable solvents, operating at temperatures comprised between 20° C. and 126° C., preferably between 80° C. and 126° C., and for a time period comprised between 10 minutes and 8 hours, preferably between 1 and 5 hours. The amount of vanadium compound to be used in each of the subsequent reactions is in excess with respect to the electron-donor compound complexed with $MgCl_2$.

According to an alternate method, the steps of preparing the $MgCl_2$ support and supporting the vanadium compound are carried out separately. In this case, the preparation of the MgCl$_2$ support can be carried out by reacting the adduct between MgCl$_2$ and the electron-donor compound with a halogenated silicon compound such as R$_a$SiCl$_{4-a}$, where R is a hydrocarbon radical containing from 1 to 12 carbon atoms and a can vary from 0 to 3, said silicon compound being used neat or diluted in suitable solvents and in an amount which is in excess with respect to the electron-donor compound. Generally, the reaction is carried out at the boiling temperature of the reaction medium.

The preparation of the MgCl$_2$ support can also be carried out by reacting the adduct between MgCl$_2$ and the electron-donor compound with a halogenated aluminum compound such as AlR$_{3-b}$X$_b$, where X=Cl, Br or I, each R is independently an alkyl radical containing up to 14 carbon atoms and b=0, 1 or 1.5, or with BCl$_3$, the aluminum compound or BCl$_3$ being used in solution in suitable solvents. The molar ratio between the aluminum or boron compound and the electron-donor compound complexed with MgCl$_2$ is comprised between 0.3 and 10, preferably between 0.5 and 5. The reaction is carried out at temperatures comprised between −10° C. and 100° C., preferably between 0° C. and 60° C., and for a time period comprised between 10 minutes and 8 hours, preferably between 1 and 5 hours.

The process of supporting the vanadium compound can be carried out by treating the magnesium chloride with an excess of said compound in neat form, as indicated above, or by treatment in halogenated or non-halogenated aliphatic or aromatic hydrocarbon solvents wherein the vanadium compound is present at molar ratios with respect to MgCl$_2$ comprised between 0.05 and 10, preferably between 0.1 and 5, operating at temperatures comprised between 20° C. and 126° C., preferably between 50° C. and 100° C. and in any event not greater than the boiling temperature of the solvent used.

Both after the preparation of the MgCl$_2$ support and after the reaction for supporting the vanadium compound, the solid product is repeatedly washed with aliphatic and/or aromatic hydrocarbon solvents at temperatures comprised between 0° C. and 100° C., preferably between 20° C. and 80° C., and the product is finally vacuum dried.

The vanadium content in the solid catalyst component can vary from 0.1% to 15% by weight, preferably from 0.5% to 8%.

The catalysts object of the invention are employed in the (co)polymerization of olefins CH$_2$=CHR according to the known methods: in the gas phase or in the liquid phase (in solvent or liquid monomer).

Examples of useful solvents are: propane, butane, hexane, heptane and cyclohexane. The operating temperature can be comprised between 0° C. and 200° C., in particular between 50° C. and 90° C., and the operating pressure can be equal to the atmospheric pressure or greater.

The activity of the catalysts prepared from the catalyst components of the invention can be increased by introducing a halogenated hydrocarbon as activator during the polymerization stage. Preferred halogenated hydrocarbons are the saturated aliphatic halogenated hydrocarbons and in particular CHCl$_3$ and 2,2-difluorotetrachloroethane.

The catalysts obtained from VCl$_4$ or from VOCl$_3$ are especially suited for preparing HDPE having a broad molecular weight distribution. The catalysts obtained from vanadium compounds containing OR groups or NR$_2$ groups are especially suited for preparing LLDPE having a narrow molecular weight distribution.

The catalysts of the invention are advantageously employed for preparing saturated elastomeric copolymers of ethylene and α-olefins CH$_2$=CHR, where R is an alkyl radical having 1–8 carbon atoms, and unsaturated elastomeric copolymers of ethylene with said olefins CH$_2$=CHR and minor amounts of a diene.

The values of porosity and surface area reported in this text and in the examples have been obtained according to the B.E.T. method using a SORPTOMATIC 1800 - C. Erba apparatus.

The following examples are provided for illustrative and not limitative purposes.

In the examples the polymerization has been carried out according to one of the following methods:

Method A:

At 90° C. and under vacuum, 700 ml of anhydrous n-heptane containing 1.6 mmoles of triisobutyl aluminum (AliBu$_3$) and 20 mg of solid catalyst component in suspension are introduced into a 2 l stainless steel autoclave equipped with an anchor stirrer and having been previously purged three times with vacuum-nitrogen. Thereafter 1.5 bar of hydrogen and subsequently ethylene up to a total pressure of 12 bar are introduced; while ethylene feeding continues in order to maintain a constant total pressure, stirring is initiated and the polymerization is carried out at 90° C. for 4 hours. At the end the unreacted ethylene is removed, the obtained polymer is filtered, oven dried to constant weight at 70° C. under a nitrogen flow and weighed to determine the polymerization yield obtained.

Method B:

Using the same autoclave and the same procedure as described for method A, 700 ml of anhydrous n-heptane containing 1.6 mmoles of AliBu$_3$, 3.2 mmoles of CHCl$_3$ and 15 mg of solid catalyst component in suspension are introduced, at 70° C. and under vacuum, into the autoclave. Thereafter 2 bar of hydrogen and subsequently ethylene up to a total pressure of 12 bar are introduced; while ethylene feeding continues in order to maintain a constant total pressure, stirring is initiated and the polymerization is carried out at 70° C. for 4 hours. The polymerization yield is determined as described for method A.

Method C:

The operating procedure is as described for method B, except that 3.2 mmoles of 2,2-difluorotetrachloroethane are used in place of CHCl$_3$.

The produced polymers are characterized according to the ASTMD1238-85 method, using the following parameters:

Melt Index at 190° C. using a weight of 2.16 Kg (MI$_{2.16}$)

Melt Index at 190° C. using a weight of 21.6 Kg (MI$_{21.6}$)

Ratio MI$_{21.6}$/MI$_{2.16}$ (MIR)

EXAMPLE 1

125 ml of VOCl$_3$ are introduced at 0° C. and under an inert atmosphere into a 250 ml reactor equipped with a filtering baffle. While stirring, 6.3 g of microspheroidal MgCl$_2$·2C$_2$H$_5$OH, obtained by partial dealcoholation of a MgCl$_2$·3C$_2$H$_5$OH adduct prepared in accordance with the procedure of Example 2 of U.S. Pat. No. 4,399,054, but operating at 3,000 RPM instead of 10,000 RPM, are added over a period of 15 minutes.

Upon completion of this addition, the temperature is brought to 120° C. and the reaction is allowed to proceed at this temperature for 2 hours, followed by filtration and introduction of additional 125 ml of VOCl$_3$, allowing the reaction to proceed for 2 hours still at 120° C.; at the end filtration and repeated washing with anhydrous n-heptane until all chlorine ions in the filtrate have disappeared are effected, and finally the solid catalyst component is vacuum dried. A product having the following characteristics is obtained:

Mg=20.8% by weight;
V=4.2% by weight;
porosity=0.25 cm$^3$/g;
surface area=240 m$^2$/g.

Ethylene is polymerized using method A; obtained yields and polymer characteristics are reported in Table 1.

EXAMPLE 2

Preparation of MgCl$_2$ by reacting MgCl$_2$.2C$_2$H$_5$OH with SiCl$_4$ 100 ml of SiCl$_4$ are introduced, at room temperature and under an inert atmosphere, into a 250 ml 3-necked round bottom flask equipped with a mechanical stirrer. While stirring, 5.1 g of microspheroidal MgCl$_2$.2C$_2$H$_5$OH are added, over a period of 15 minutes, and thereafter heating under reflux for 48 hours is effected; at the end cooling to room temperature is effected, the solid product obtained is filtered, repeatedly washed with anhydrous n-heptane until all chlorine ions in the filtrate have disappeared and vacuum dried. The thus obtained MgCl$_2$ contains 22.5% by weight of Mg and 67.4% of Cl.

Procedure for supporting VOCl$_3$ onto MgCl$_2$ 50 ml of 1,2-dichloroethane (1,2-DCE) and 2.2 ml of VOCl$_3$ are introduced, at room temperature and under an inert atmosphere, into a 100 ml 3-necked round bottom flask equipped with a mechanical stirrer, and thereafter 2.2 g of MgCl$_2$ obtained as described above are added, while stirring and over a period of 10 minutes.

The temperature is brought to 80° C. and the reaction is allowed to proceed at this temperature for 2 hours, then the solid product obtained is filtered, repeatedly washed in anhydrous n-heptane until all chlorine ions in the filtrate have disappeared and vacuum dried. A product having the following characteristics is obtained:

Mg=21.3% by weight;
V=2.2% by weight;
porosity=0.21 cm$^3$/g;
surface area=215 m$^2$/g.

Ethylene is polymerized using method B; obtained yields and polymer characteristics are reported in Table 1.

EXAMPLE 3

Preparation of MgCl$_2$ by reacting MgCl$_2$.2C$_2$H$_5$OH with AlEt$_3$ 1 l of anhydrous n-heptane and 1 l of an hexane solution containing 0.85 moles of AlEt$_3$ are introduced, at 0° C. and under an inert atmosphere, into a 3-necked round bottom flask equipped with a mechanical stirrer, and then, while maintaining the temperature between 0° C. and 10° C., 66 g of microspheroidal MgCl$_2$.2C$_2$H$_5$OH are added, while stirring and over a one hour period. Upon completion of these additions, the reaction is allowed to proceed for about 2 hours at room temperature until gas evolution is no more observed. At the end the solid product obtained is filtered, repeatedly washed with anhydrous n-heptane and vacuum dried.

The thus obtained MgCl$_2$ contains 24.1% by weight of Mg and 71.2% of Cl.

Procedure for supporting VOCl$_3$ onto MgCl$_2$

The procedure is as described in Example 2, except that the MgCl$_2$ obtained from the reaction with AlEt$_3$ is used. A product having the following characteristics is obtained:

Mg=17.1% by weight;
V=5.8% by weight;
porosity=0.17 cm$^3$/g;
surface area=368 m$^2$/g.

The X-ray spectrum of the product shows a halo having maximum intensity at an angle 2θ=33.7°.

Ethylene is polymerized using both method B and method C; obtained yields and polymer characteristics are reported in Table 1.

EXAMPLE 4

Procedure for supporting VOCl$_3$ onto MgCl$_2$

The procedure is as described in Example 2, except that the MgCl$_2$ obtained from the reaction with AlEt$_3$ and 4.4 ml of VOCl$_3$ are used. A product having the following characteristics is obtained:

Mg=16.9% by weight;
V=6.1% by weight;
porosity=0.15 cm$^3$/g;
surface area=350 m$^2$/g.

The X-ray spectrum of the product shows a halo having maximum intensity at an angle 2θ=33.8°.

Ethylene is polymerized using method B; obtained yields and polymer characteristics are reported in Table 1.

EXAMPLE 5

Procedure for supporting VOCl$_3$ onto MgCl$_2$

The procedure is as described in Example 2, except that the MgCl$_2$ obtained from the reaction with AlEt$_3$ and 1.1 ml of VOCl$_3$ are used. A product having the following characteristics is obtained:

Mg=17.9% by weight;
V=4.0% by weight;
porosity=0.20 cm$^3$/g;
surface area=384 m$^2$/g.

The X-ray spectrum of the product shows a halo having maximum intensity at an angle 2θ=33.6°.

Ethylene is polymerized using method B; obtained yields and polymer characteristics are reported in Table 1.

EXAMPLE 6

The procedure is as described in Example 2, except that 6.2 g of the MgCl$_2$ obtained from the reaction with AlEt$_3$ is used in place of microspheroidal MgCl$_2$.2C$_2$H$_5$OH. A product having the following characteristics is obtained:

Mg=16.5% by weight;
V=7.8% by weight;
porosity=0.14 cm$^3$/g;
surface area=315 m$^2$/g.

The X-ray spectrum of the product shows a halo having maximum intensity at an angle 2θ=33.7°.

Ethylene is polymerized using method B; obtained yields and polymer characteristics are reported in Table 1.

COMPARATIVE EXAMPLE 1

5 g of SiO$_2$ (Grace 952) calcined under vacuum at 250° C. for 6 hours are introduced at 0° C., over a period of 15 minutes and while stirring, into a 250 ml 3-necked round bottom flask containing 100 ml of a 0.4 M AlEt$_3$ solution in heptane. The reaction is allowed to proceed at room temperature until no more gas evolution is observed, and then the solid is filtered, repeatedly washed with n-heptane and vacuum dried. The procedure for supporting VOCl$_3$ is as described in Example 2, except that 2.2 g of SiO$_2$ treated as indicated above is used.

Elemental analysis (% by weight): V=6.7%.

Ethylene is polymerized using method B; obtained yields and polymer characteristics are reported in Table 1.

TABLE 1

Polymerization Results and Characterization of the Obtained Polymers

| Example | Polymerization Method | Yield g$_{PE}$/g$_{Cat}$ | MI$_{2,16}$ g/10 min | MI$_{21,6}$ g/10 min | MIR |
|---|---|---|---|---|---|
| 1 | A | 4200 | 0,36 | 28,7 | 80 |
| 2 | B | 7000 | 0,31 | 21,6 | 70 |
| 3 | B | 7900 | 0,40 | 35,1 | 88 |
|   | C | 6300 | 0,16 | 14,4 | 90 |
| 4 | B | 6200 | 0,11 | 11,6 | 105 |
| 5 | B | 11400 | 0,29 | 22,0 | 76 |
| 6 | B | 8600 | 0,44 | 31,2 | 71 |
| 1 Comparative | B | 4000 | 0,10 | 7,3 | 73 | g$_{PE}$/g$_{Cat}$ = Polymerization yield in g of Polyethylene/g of Catalyst

We claim:

1. A spherical component of catalysts for the polymerization of olefins, which comprises a single transition metal compound, the single transition metal compound consisting essentially of a vanadium compound having the formula VOX$_2$Y or VX$_n$Y$_{4-n}$, wherein:

X is Cl or Br;

Y is Cl, Br, OR or NR'$_2$, wherein:
  R is a C$_1$–C$_{18}$ aliphatic or cycloaliphatic or aromatic hydrocarbon radical;
  R' is a C$_1$–C$_{10}$ aliphatic or cycloaliphatic hydrocarbon radical; and
2≤n≥4;

the vanadium compound being supported on an MgCl$_2$ support in spherical form and the component having an average diameter greater than 1 μm, a surface area of at least 10 m$^2$/g, a porosity of at least 0.1 cm$^3$/g and an X-ray spectrum wherein:
  a) reflections are present at angles 2θ of 35° and 14.95°; or
  b) the reflection at 2θ=35° is replaced by a halo showing a maximum of intensity between angles 2θ of 33° and 35°.

2. The component of catalysts of claim 1, wherein the vanadium compound is selected from the group consisting of: VOCl$_3$, VCl$_4$, VO(O-Me)Cl$_2$, VO(O-Et)Cl$_2$, VO(O-nBu)Cl$_2$, VO(O-iBu)Cl$_2$, VO(O-C$_6$H$_5$)Cl$_2$, VCl$_3$(O-Me), VCl$_3$(O-Et), VCl$_3$(O-nBu), VCl$_3$(O-iBu), VCl$_3$(O-C$_6$H$_5$), VCl$_2$(O-Me)$_2$, VCl$_2$(O-Et)$_2$, VCl$_2$(O-nBu)$_2$, VCl$_2$(O-iBu)$_2$, VO(N-Me$_2$)Cl$_2$, VO(N-Et$_2$)Cl$_2$, VO(N-nBu$_2$)Cl$_2$, VCl$_3$(N-Me$_2$), VCl$_3$(N-Et$_2$) and VCl$_3$(N-nBu$_2$).

3. The component of catalysts of claim 2, wherein the surface area is greater than 50 m$^2$/g and the porosity is comprised between 0.1 and 0.5 cm$^3$/g.

4. The component of catalysts of claim 3, wherein the surface area is comprised between 50 and 400 m$^2$/g.

5. The component of catalysts of claim 1, wherein the X-ray spectrum is of type b), the halo shows a maximum of intensity between angles 2θ of 33.5° and 35° and the reflection at 2θ=14.95° is not present.

6. A catalyst for the (co)polymerization of olefins, which comprises the product of the reaction between the component of catalysts of claim 1 and an alkyl aluminum compound.

7. The catalyst of claim 6, wherein the alkyl aluminum compound is an Al-trialkyl.

8. The catalyst of claim 6, wherein the alkyl aluminum compound is selected from the group consisting of: AlEt$_3$, AlBu$_3$, AliBu$_3$ and Al(n-C$_5$H$_{13}$)$_3$.

9. A process for the preparation of the catalyst component of claim 1 which comprises reacting
  (a) an adduct of MgCl$_2$ with an electron donor component, with
  (b) the vanadium compound at a temperature from about 20° to 126° C. and for between about 10 minutes and 8 hours.

10. The process of claim 9 wherein the adduct of MgCl$_2$ with an electron-donor compound is first reacted with a compound selected from the group consisting of AlR$_{3-b}$X$_b$ and R$_a$SiCl$_{4-a}$ where
  (a) each R is independently an alkyl radical containing up to 14 carbon atoms and "b" is equal to 0, 1 or 1.5,
  (b) X is Cl, Br or I,
  (c) each R' is independently a hydrocarbon radical containing from 1 to 12 carbon atoms and "a" ranges from 0 to 3.

11. The process of claim 9 wherein the adduct is MgCl$_2$-nROH where R is an alkyl, cycloalkyl, or alkylaryl radical having from 1 to 12 carbon atoms and "n" ranges from about 0.2 to 3.

12. Components of catalysts according to claim 1, wherein from 0.1% to 15% by weight of said vanadium compound is present in said catalyst component.

* * * * *

UNITED STATES PATENT AND TRADEMARK OFFICE
CERTIFICATE OF CORRECTION

PATENT NO. : 5,508,245
DATED     : April 16, 1996
INVENTOR(S) : Morini et al.

It is certified that error appears in the above-indentified patent and that said Letters Patent is hereby corrected as shown below:

| Column | Line | Delete | Insert |
|--------|------|--------|--------|
| 8 | 25 | "$Al(n-C_5H_{13})_3.$" | --$Al(n-C_6H_{13})_3.$-- |

Signed and Sealed this

Thirteenth Day of August, 1996

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,508,245

DATED : April 16, 1996

INVENTOR(S): Morini et al.

It is certified that error appears in the above-identified patent and that said Letters Patent is hereby corrected as shown below:

| Column | Line | Delete | Insert |
|---|---|---|---|
| 7 | 40 | "$2 \leq n \geq 4;$" | --$2 \leq n \leq 4;$-- |

Signed and Sealed this

First Day of October, 1996

Attest:

Attesting Officer

BRUCE LEHMAN

Commissioner of Patents and Trademarks